March 20, 1934.　　　　R. E. GREEN　　　　1,951,654

METHOD OF MAKING A CABLE CONNECTER

Filed Nov. 7, 1931

INVENTOR
Russell E. Green,
BY
ATTORNEYS

Patented Mar. 20, 1934

1,951,654

UNITED STATES PATENT OFFICE 1,951,654

METHOD OF MAKING A CABLE CONNECTER

Russell E. Green, Detroit, Mich.

Application November 7, 1931, Serial No. 573,659

1 Claim. (Cl. 29—148.2)

The present invention pertains to a novel sleeve member for connecting the ends of high voltage cables, whether they be round or otherwise shaped in cross section.

The principal object of the invention is to provide a device of this character which receives the ends to be joined and which may readily be filled with solder to perfect the contact. Moreover, it is another object to provide a connecting sleeve which lends itself to an economical method of manufacture. Accordingly, the sleeve is formed by mold casting, die casting, forging or by shaping a piece of strip material, but preferably by the use of copper tubing which readily lends itself to the formation of an efficient connecting sleeve of the desired shape.

The individual conductors of multi-conductor cables are now frequently produced in sector shape, and the copper tubing may be readily worked into this shape by the use of the proper dies and tools.

In order that solder may be poured into the sleeve, slots are cut lengthwise or transversely in the latter but not more than one lengthwise slot may reach the ends of the sleeve, so that the special shape remains intact.

Various other shapes are formed to receive conductors of different sizes or shapes in the ends thereof. For example, a given sleeve may receive two sector-shaped conductors of different sizes or a sector-shaped conductor and a circular conductor.

The invention is fully disclosed by way of example in the following description and in the accompanying drawing, in which Figure 1 is an elevation, partly in section, of a cable joint;

Reference to these views will now be made by use of like characters which are employed to designate corresponding parts throughout.

Figure 1:
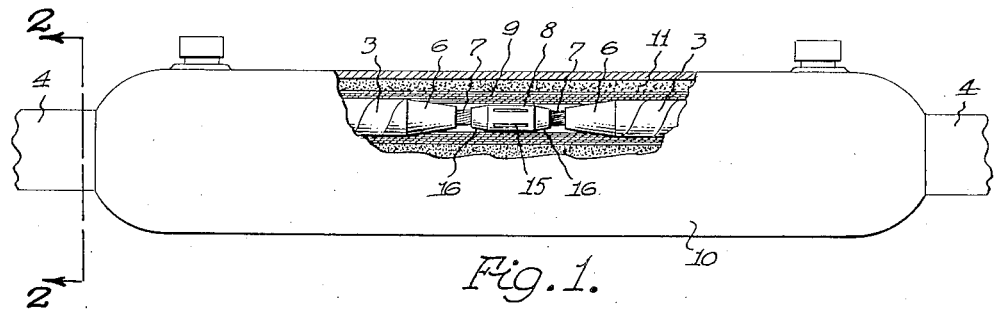
Figure 2:
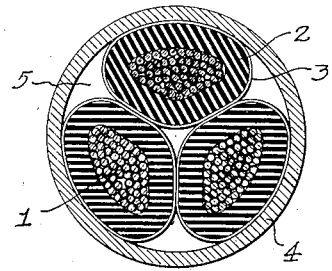
Fig. 2 is a section on the line 2—2 of Figure 1.

In Fig. 1 is illustrated a joint of a multi-conductor cable, and the construction of the cable is shown more clearly in Fig. 2. The cable in this case consists of three insulated conductors of the so-called sector shape. Each conductor consists of a group of cable wires or strands 1 enclosed in an insulating sheath 2. A metallic ribbon or foil 3 is wound around each insulator, and the three sectors thus constituted are enclosed in an outer covering 4. Each element or conductor of the cable has the shape of a sector in cross-section, with the corners rounded. Because of this form, three such conductors may readily be assembled to form a body of generally circular cross-section with a comparatively small amount of open space 5 within the circumscribed circle.

In joining the ends of two such cables the ends are obviously stripped of the outer covering 4. Moreover, the extremities of the individual conductors are stripped of their insulation 2, as indicated by the numeral 6 in Fig. 1, to expose the bare ends 7. Opposed bare ends 7 are inserted in connecting sleeves 8 which are subsequently filled with solder. The joint thus formed between each pair of opposed conductors is wrapped, as at 9, and the whole joint is enclosed in a housing 10 which is subsequently filled with a suitable insulating material 11 poured therein according to a method already known in the art.

Figure 3:
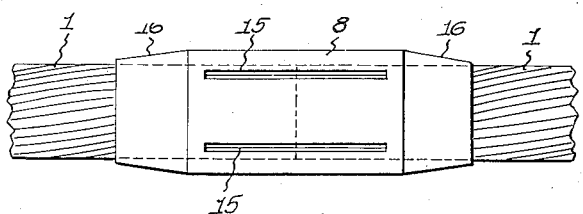
Fig. 3 is a detail elevation of the joint.
Figures 4, 6:
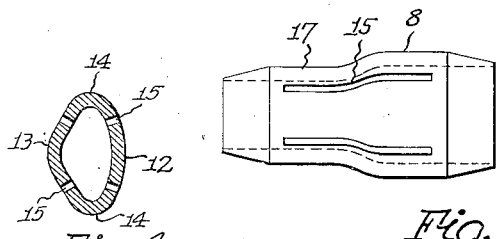
Fig. 4 is a cross-section of the connecting sleeve.
Fig. 6 is an elevation of a modified form.
Figure 5:
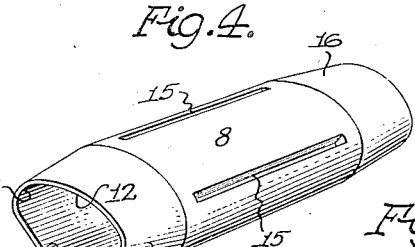
Fig. 5 is a perspective view of the sleeve.

The present invention relates to the connecting sleeve 8 which is shown in detail in Figs. 3, 4 and 5. This member may be mold cast, die cast, forged or made of flat strip but is preferably shaped from cylindrical copper tubing. The member is, in this instance, sector shaped in cross section and comprises an arcuate side 12 and radial sides 13, with the corners rounded as indicated by the numeral 14. Several longitudinal slots 15 are cut through the walls of the member, and it is to be noted that these slots terminate short of the ends of the member, or, in other words, are closed at both ends. These slots may be stamped or sawed in the sleeve. Finally, the ends of the sleeve are reduced, for example by tapering, as at 16, to reduce the electrical stresses between each end and the adjacent conducting strands 1. The previously mentioned solder for filling the connecting member and perfecting the contact between the joint conductors is poured in through the slots 15. In order to provide adherence between the solder and the copper sleeve, the latter should be tinned and the tinning is done preferably by electrolytic means. In forming the sleeve from cylindrical copper tubing, the reduced or chamfered ends are formed in cutting off the required lengths, and the sectoral cross sectional shape is subsequently imparted thereto by the use of suitable dies and tools in one or more operations. After the initial forming operations, the slots are cut, the burrs are taken off the ends, a final forming operation is performed if necessary, and then the piece is plated.

In Fig. 6 is illustrated the connecting sleeve for joining the conductors of different sizes. The sleeve is formed by any of the means previously described and of such size as to take the larger conductor. One end, however, is drawn to a smaller size, as indicated by the numeral 17, and this end may or may not be shaped similarly to the larger end, but in either case is shaped to receive the smaller conductor.

Figure 7:
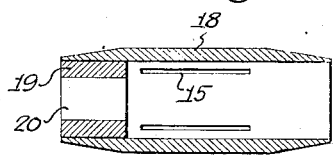
Fig. 7 is a longitudinal section of another modification.

Fig. 7 shows a modification adapted to take a sector-shaped conductor in one end and a circular conductor in the other end. A sector-shaped sleeve 18 is formed by any of the means previously described, and in the one end thereof is fitted a bushing 19 having a cavity 20 of such size as to receive the other conductor. The cavity may be of any desired shape such as circular, sector-shaped, D-shape, etc.

Figure 8:
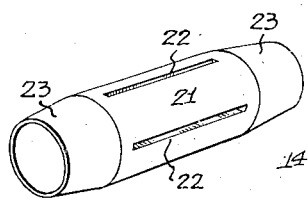
Fig. 8 is a perspective view of still another modification.

Fig. 8 shows a sleeve 21 for receiving equal circular conductors in both ends. This member is made of copper tubing or strip or made by any of the other means previously described and is formed with slots 22 and the tapered ends 23 in the manner described, but obviously need not be re-shaped.

Figure 9:
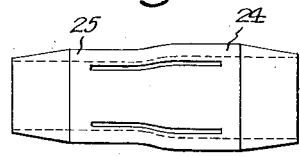
Fig. 9 is an elevation of a connecting sleeve having one end round and the other end sector-shaped.
Figure 10:
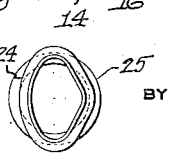
Fig. 10 is an end view thereof.

Figs. 9 and 10 show another device for receiving a sector-shaped conductor in one end and a circular conductor in the other end. A circular sleeve 24 is made up in the manner described in connection with Fig. 8. One end thereof is drawn by means of suitable dies and tools to a circular cross-sectional formation as indicated by the numeral 25. This end obviously is adapted to receive a circular conductor, while the other end receives a sector-shaped conductor.

Although specific embodiments of the invention have been illustrated and described, it will be understood that various alterations in the details of construction may be made without departing from the scope of the invention as indicated by the appended claim.

What I claim is:—

The method of making a tubular connecter for the ends of conductors consisting in cutting off the required length of cylindrical copper tubing, chamfering the ends of the length of tubing, forming said cylindrical tubing into a sectoral cross sectional shape, and forming slots in said shaped tubing.

RUSSELL E. GREEN.